(12) United States Patent
Kuhlman et al.

(10) Patent No.: US 8,477,401 B1
(45) Date of Patent: Jul. 2, 2013

(54) WINDSHIELD WITH FLUORESCENT ELECTROWETTING DISPLAY

(75) Inventors: Frederick F. Kuhlman, Kokomo, IN (US); David K. Lambert, Sterling Heights, MI (US); Dwadasi H. R. Sarma, Kokomo, IN (US); Kris R. Stark, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/314,249

(22) Filed: Dec. 8, 2011

(51) Int. Cl.
*G02F 1/03* (2006.01)
*G02F 1/29* (2006.01)
*B60Q 1/26* (2006.01)

(52) U.S. Cl.
USPC .......... 359/245; 359/259; 359/316; 359/630; 362/503; 345/7

(58) Field of Classification Search
USPC ................. 359/245, 296, 265–275; 340/435, 340/436, 472, 903; 362/84, 259, 260, 293, 362/489, 503, 511, 581; 717/100; 313/483; 280/728.1, 735
See application file for complete search history.

(56) References Cited

U.S. PATENT DOCUMENTS

| | | | | |
|---|---|---|---|---|
| 5,729,366 A | * | 3/1998 | Yang | ................................. 359/13 |
| 6,821,007 B1 | * | 11/2004 | Olman et al. | .................. 362/511 |
| 7,034,778 B1 | * | 4/2006 | Hahl | ................................... 345/7 |
| 7,430,355 B2 | | 9/2008 | Heikenfeld et al. | |
| 7,872,790 B2 | | 1/2011 | Steckl et al. | |
| 7,922,373 B2 | * | 4/2011 | Yamamoto et al. | ........... 362/489 |
| 2011/0007046 A1 | | 1/2011 | Tsai et al. | |
| 2011/0317273 A1 | * | 12/2011 | Kasai et al. | .................... 359/630 |
| 2012/0020102 A1 | * | 1/2012 | Lambert et al. | ................ 362/503 |

FOREIGN PATENT DOCUMENTS

DE 10 2009 021 638 A1 11/2010

OTHER PUBLICATIONS

Steckl, et al.: "Light Wave Coupled Flat Panel Displays and Solid-State Lighting Using Hybrid Inorganic/Organic Materials", IEEE/OSA Journal of Display Technology, vol. 1 No. 1, Sep. 2005, pp. 157-166.
Heikenfeld, et al.: "Intense switchable fluorescence in light wave coupled electrowetting devices", Applied Physics Letters 86, 011105 (2005), published online Dec. 22, 2004), pp. 86, 011105-1-86, 011105-3.
Heikenfeld, et al.: "Demonstration of Fluorescent RGB Electrowetting Devices for Light Wave Coupling Displays", 2004, pp. 1 through 4.
European Search Report dated Mar. 19, 2013.

* cited by examiner

*Primary Examiner* — Loha Ben
(74) *Attorney, Agent, or Firm* — Lawrence D. Hazelton

(57) ABSTRACT

A windshield assembly that includes a fluorescent electrowetting cell and an opaque electrowetting cell overlying a windshield and configured so the opaque electrowetting cell cooperates with the fluorescent electrowetting cell to contrast an image displayed by the fluorescent electrowetting cell with respect to a field of view beyond the windshield assembly. The ability to contrast the image makes the image easier to see when bright sunlight is present.

13 Claims, 5 Drawing Sheets

WINDSHIELD WITH FLUORESCENT ELECTROWETTING DISPLAY

TECHNICAL FIELD OF INVENTION

This disclosure generally relates to a windshield assembly equipped with fluorescent electrowetting type display, and more particularly relates to a windshield assembly that includes a fluorescent electrowetting layer and an opaque electrowetting layer arranged to contrast an image displayed by a fluorescent electrowetting cell with respect to a field of view beyond the windshield assembly.

BACKGROUND OF INVENTION

Vehicle manufacturers desire windshield assemblies able to display information anywhere on the windshield. By displaying information on the windshield, an operator of a vehicle may be able to better concentrate on a field of view of the area forward of the vehicle, as compared to when similar information is displayed on a vehicle instrument panel positioned below the field of view. Various arrangements of fluorescent films and transparent displays have been proposed, but such displays generally aren't bright enough to be useful in bright sunlight.

SUMMARY OF THE INVENTION

In accordance with one embodiment, a windshield assembly configured for installation onto a vehicle is provided. The assembly includes a windshield, a fluorescent electrowetting cell, and an opaque electrowetting cell. The fluorescent electrowetting cell overlies a portion of the windshield. The fluorescent electrowetting cell is operable to a fluorescent state where the fluorescent electrowetting cell fluoresces when illuminated with suitable light, and operable to a transparent state where most light passes through the fluorescent electrowetting cell. The opaque electrowetting cell is arranged proximate to the fluorescent electrowetting cell. The opaque electrowetting cell is operable to an opaque state where most light is blocked from passing through the opaque electrowetting cell, and a clear state where most light passes through the opaque electrowetting cell. The portion is substantially transparent when the fluorescent electrowetting cell is operated to the transparent state and the opaque electrowetting cell is operated to the clear state. The opaque electrowetting cell cooperates with the fluorescent electrowetting cell to contrast an image displayed by the fluorescent electrowetting cell with respect to a field of view beyond the assembly.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
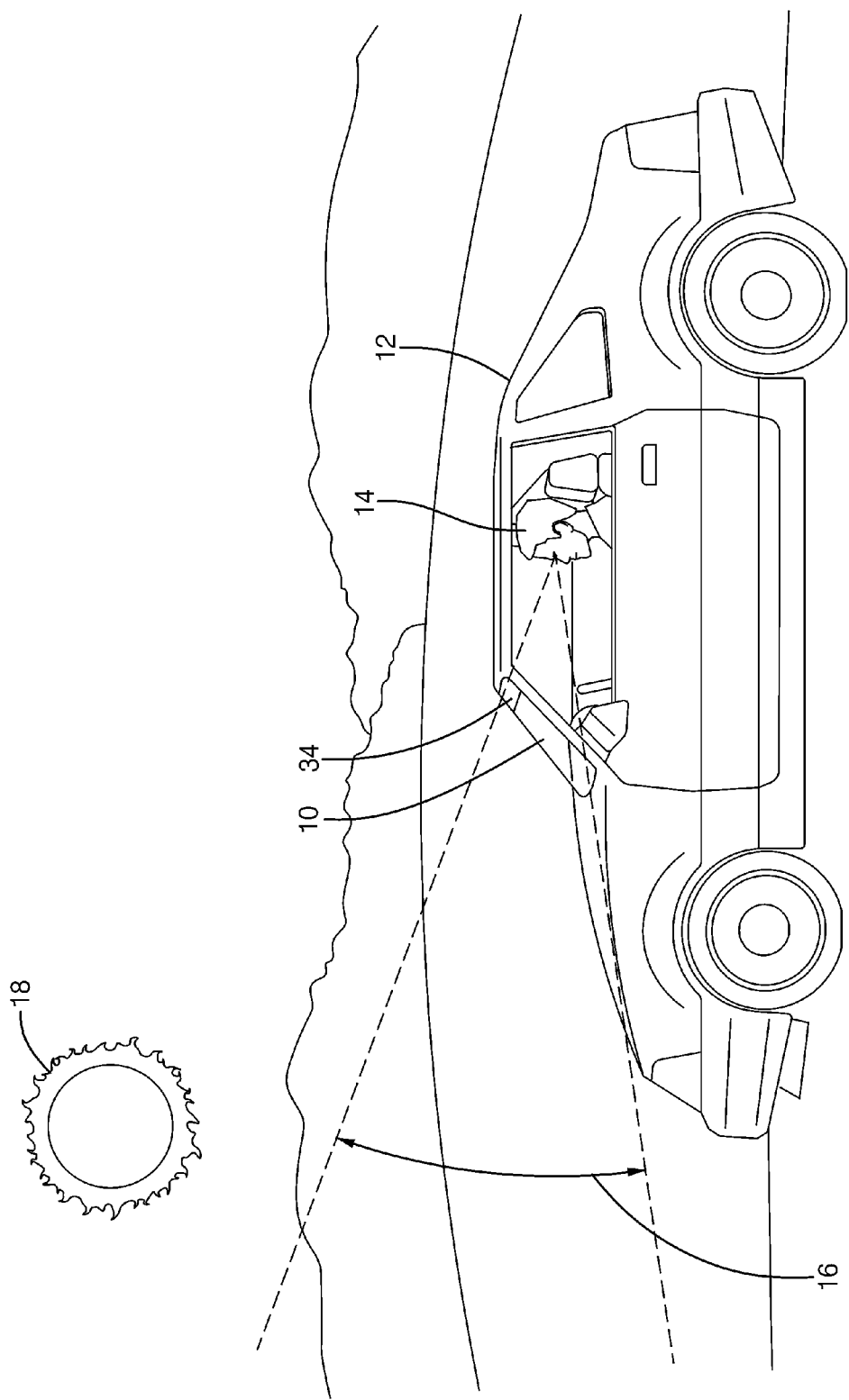
FIG. 1 is a side view of a vehicle equipped with a windshield assembly in accordance with an embodiment.

FIG. 1 illustrates a non-limiting example of a windshield assembly 10, hereafter often assembly 10, installed in a vehicle 12. In general, the assembly 10 displays information such as graphical symbols or alpha-numeric characters on the assembly 10 so that an operator 14 of the vehicle 12 does not need to avert his/her eyes from a field of view 16 forward of the vehicle 12 to perceive displayed information. In general, the assembly 10 may be operated to a transparent or clear state so that the operator 14 is able to see clearly through the entire area of the assembly 10, or images may be superimposed into the field of view 16. The images are preferably formed by fluorescent material that may be illuminated to fluoresce by the sun 18 and/or ultraviolet (UV) light sources 20 (FIG. 2), such as a UV light emitting diode. As will be described in more detail below, the assembly 10 is generally configured to overcome problems associated with viewing a translucent fluorescent image in bright sunlight by fully surrounding or partially surrounding the fluorescent image being displayed with a contrasting edging border or surrounding area. For example, the fluorescent image may be surrounded by an opaque black area so the fluorescent image visually stands out when viewed against a blue sky background, or viewed against other bright backgrounds such as bright lights from roadway lighting, illuminated signs, or headlights from other oncoming vehicles.

Figure 2:
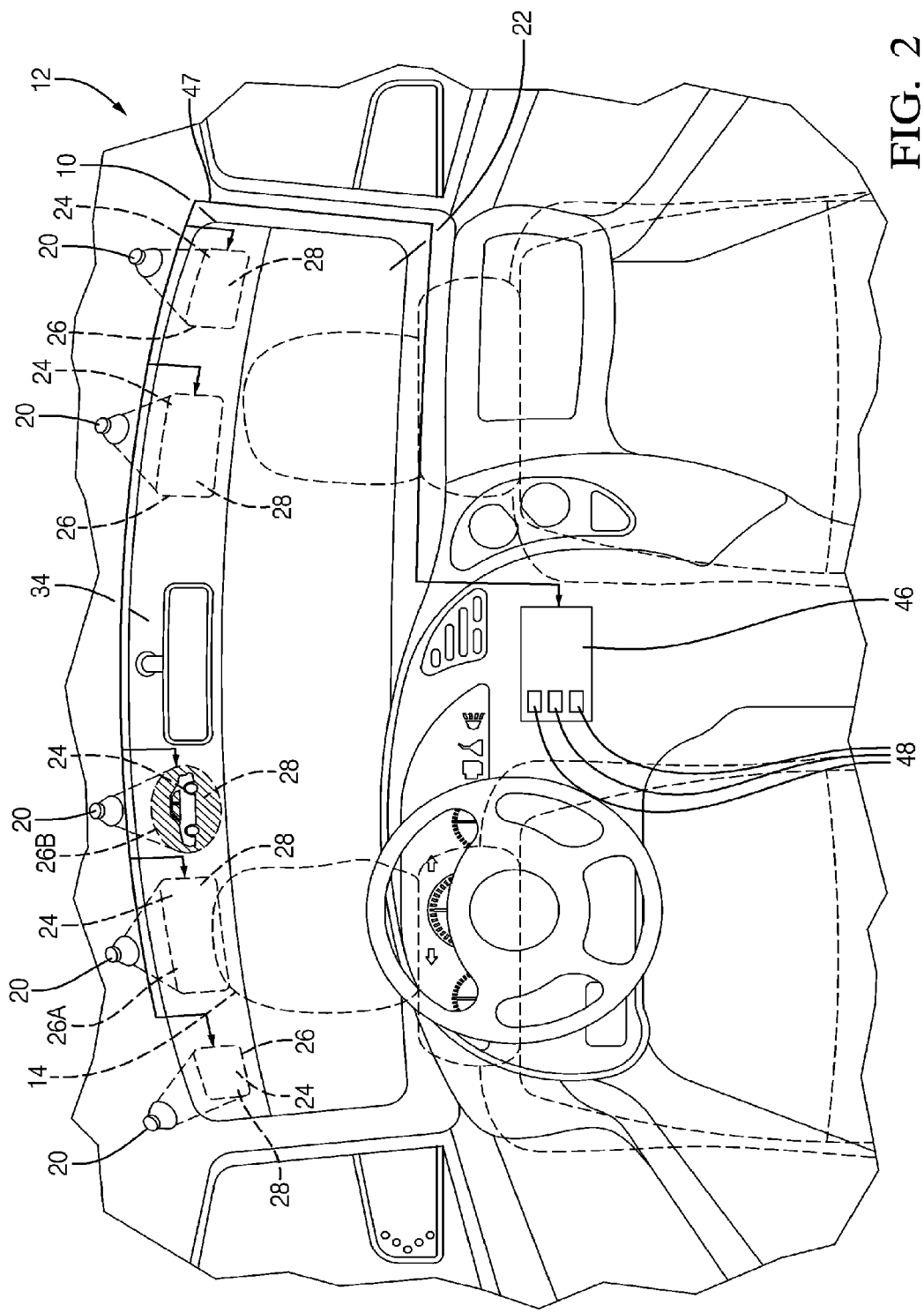
FIG. 2 is an interior view of the vehicle equipped with the windshield assembly of FIG. 1 in accordance with an embodiment.

FIG. 2 illustrates an interior view of the vehicle 12 equipped with a non-limiting example of the assembly 10. The assembly 10 may include a windshield 22 formed of, for example, tempered/safety glass that is commonly used for automobile windshields. Alternatively, the windshield 22 may be formed of a polymeric material such as polycarbonate that is sometimes used for military aircraft canopies or protective windows in off-road construction equipment.

The assembly 10 may include one or more fluorescent electrowetting cells 24 overlying one or more portions 26, 26A, 26B of the windshield 22. In general, the fluorescent electrowetting cell 24 is operable to a fluorescent state where the fluorescent electrowetting cell 24 fluoresces when illuminated with suitable light, for example sunlight from the sun 18 or UV light from the UV light source 20. Alternatively, suitable light may be projected into the edge of the assembly so that the light propagates via internal reflections throughout the windshield 22. The fluorescent electrowetting cell 24 is also generally operable to a transparent state where most light passes through the fluorescent electrowetting cell 24. As used herein, 'most light' means that the fluorescent electrowetting cell 24 is substantially transparent, and for example having a visible light transmissivity factor of 0.75 or greater.

U.S. Pat. No. 7,872,790 to Steckl et al. issued Jan. 18, 2011 describes a suitable electrowetting cell construction, the entire contents of which are hereby incorporated by reference herein. A paper entitled Demonstration of Fluorescent RGB Electrowetting Devices for Light Wave Coupling Displays by J. Heikenfeld et al. published 2004 shows an example of fluorescent electrowetting cells on a transparent substrate, the entire contents of which are hereby incorporated by reference herein. Preferably, the 'oil' layer in the fluorescent electrowetting cell 24 is translucent so that the sun 18 can be used to back-light images displayed by the fluorescent electrowetting cell 24. When the fluorescent electrowetting cell 24 is in the fluorescent state, a visible light transmissivity of 0.50 to 0.85 is preferable, but other values may be suitable. It should be appreciated that it is preferable for the light transmissivity value during the transparent state to be higher than the light transmissivity during the fluorescent state.

The assembly 10 may include one or more opaque electrowetting cells 28 arranged proximate to the fluorescent electrowetting cell 24. As used herein, proximate to the fluorescent electrowetting cell 24 includes beside, underlying or overlying, and adjacent to the fluorescent electrowetting cell 24 so that the opaque electrowetting cells 28 help to make an image displayed by the fluorescent electrowetting cells 24 easier to read or identify. In general, the opaque electrowetting cell 28 is operable to an opaque state where most light is blocked from passing through the opaque electrowetting cell 28. Preferably, the 'oil' layer in the opaque electrowetting cell 28 is black in color. As used herein, when most light is blocked by the opaque electrowetting cell 28, it means that the opaque electrowetting cell 28 preferably has a visible light transmissivity factor of 0.50 or less. The opaque electrowetting cell 28 is also operable to a clear state where most light passes through the opaque electrowetting cell. A suitable visible light transmissivity factor is 0.75 or greater.

Accordingly, the portions 26, 26A, 26B are substantially transparent when the fluorescent electrowetting cell 24 is operated to the transparent state and the opaque electrowetting cell 28 is operated to the clear state. For example, even when the fluorescent electrowetting cell 24 and the opaque electrowetting cell 28 are configured in an overlying arrangement so the same light passes through both cells, it is preferable to have a total light transmissivity greater than 0.75. Furthermore, as will be described in more detail below, the opaque electrowetting cell 28 cooperates with the fluorescent electrowetting cell 24 to contrast an image displayed by the fluorescent electrowetting cell 24 with respect to a field of view 16 that is beyond the assembly 10, in other words outside of the vehicle 12. It should be appreciated that the light transmissivity factor of the opaque electrowetting cell 28 and the fluorescent electrowetting cell 24, when operated into their various states, can be adjusted by selecting various materials for the cells, and by operating the cells part way between their end states (e.g. fully transparent or clear, fully fluorescent or opaque). It should also be appreciated that a visor region 34 covering the entire width of the assembly 10 can be equipped with opaque electrowetting cells operable to provide a sun-shade or sun-visor function to the operator 14, or possibly an area bigger than that covered by the fluorescent electrowetting cells 24.

Figure 3:
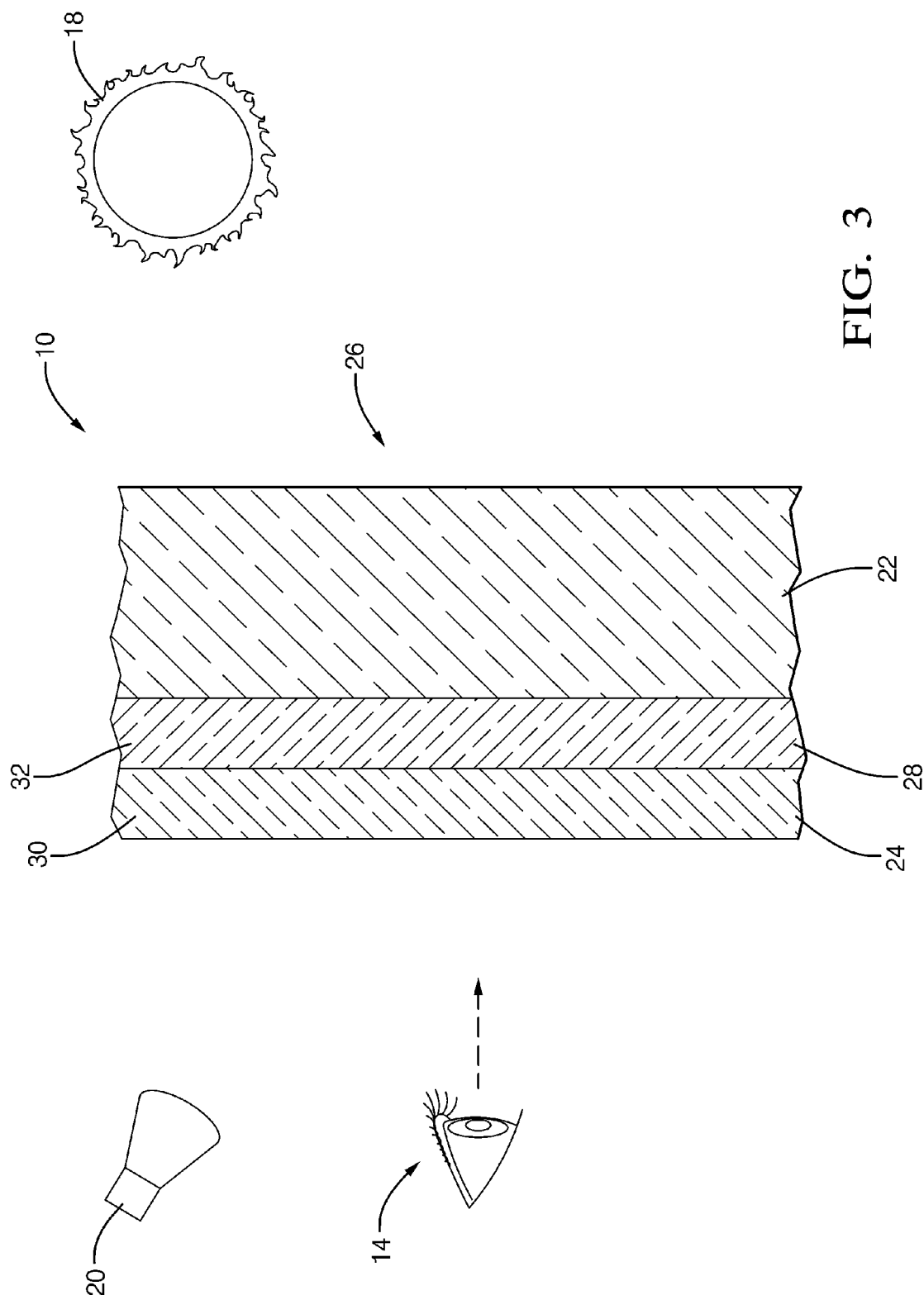
FIG. 3 is side sectional view of the windshield assembly of FIG. 1 in accordance with an embodiment.

FIG. 3 illustrates a cross section side view of a non-limiting embodiment of the assembly 10 where the fluorescent electrowetting cell 24 is disposed in a first layer 30 overlying the portion 26 (or 26A or 26B), and the opaque electrowetting cell 28 is disposed in a second layer 32 between the first layer 30 and the windshield 22. It should be understood that the first layer 30 may include a single fluorescent electrowetting cell 24 having a particular predetermined shape, a cluster of fluorescent electrowetting cells 24 arranged to operate together to display a predetermined shape, or an array of fluorescent electrowetting cells 24 each individually operable to form a reconfigurable pixelated type display capable of displaying variety of shapes. Similarly, the opaque electrowetting cells underlying the fluorescent electrowetting cell may be configured in any of these ways. It is recognized that the assembly 10 could have an alternative configuration where the first layer 30 is between the second layer 32 and the windshield 22.

Figure 4:
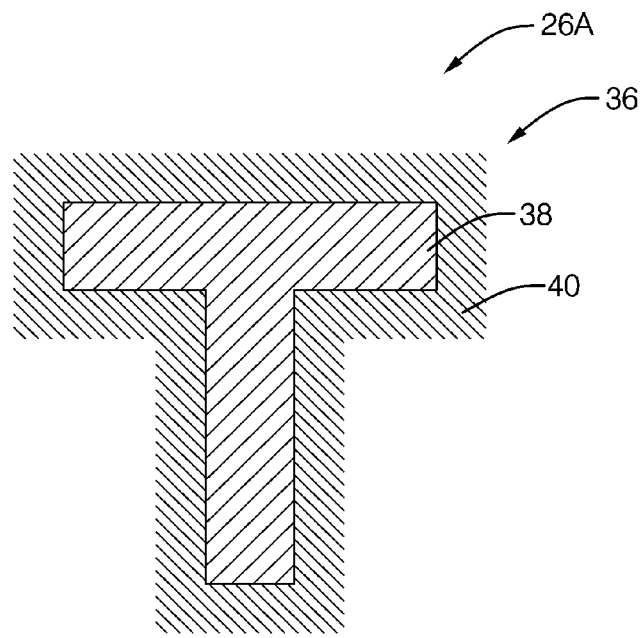
FIG. 4 is a front view of a portion of the windshield assembly of FIG. 1 in accordance with an embodiment.

FIG. 4 illustrates a front view of a non-limiting example of an image 36 in the form of an alpha-numeric character 'T' being displayed on the portion 26A for the case where both the first layer 30 and the second layer 32 are arrays of cells and each cell in each layer is aligned position and size wise with the underlying/overlying cell. In this example, a fluorescent area 38 is defined by operating a number of the fluorescent electrowetting cells within the fluorescent area 38 to the fluorescent state, and the remaining fluorescent electrowetting cells outside the fluorescent area 38 are operated to the transparent state. Similarly, an opaque area 40 outlining the fluorescent area 38 may be defined by operating opaque electrowetting cells within the opaque area 40 to an opaque state, and all other opaque electrowetting cells outside of the opaque area 40, including those underlying the fluorescent area 38, are operated to clear state. If multiple alpha-numeric characters are desired, the opaque area may individually surround each alpha-numeric character in the same manner as suggested in FIG. 4, or the opaque area 40 may encompass all of the alpha-numeric characters so light from the sun 18 or other sources is not viewable in the spaces between adjacent alpha-numeric characters.

Figure 5:
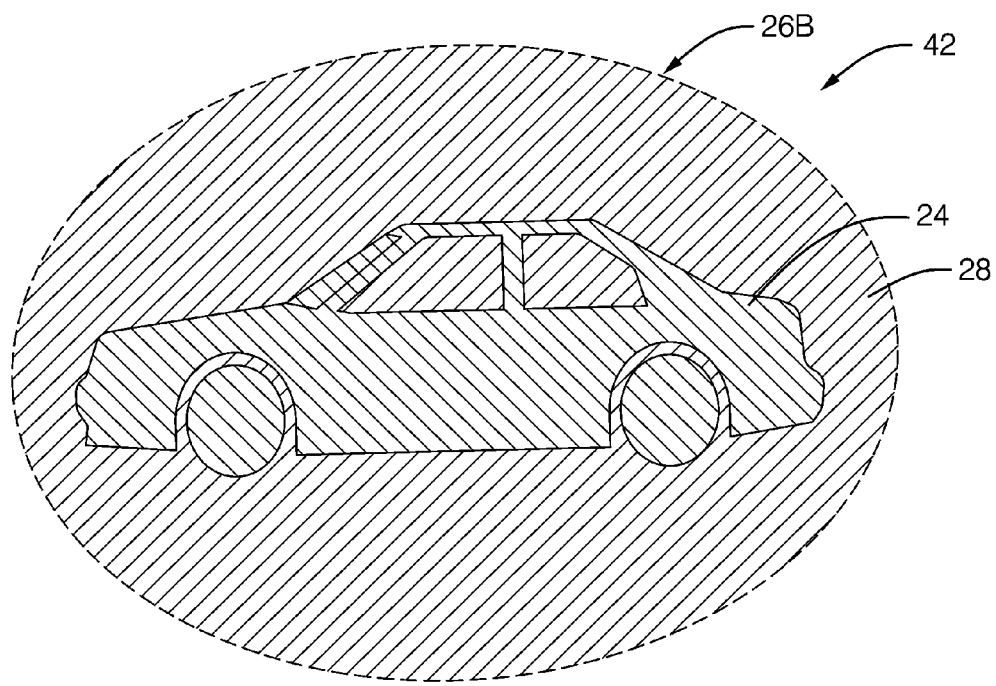
FIG. 5 is a front view of a portion of the windshield assembly of FIG. 1 in accordance with an embodiment.

FIG. 5 illustrates a front view of a non-limiting example of an image 42 displayed on the portion 26B. In this example, the first layer comprises one or more fluorescent electrowetting cells 24 configured to display predetermined shape corresponding to an automobile, and the second layer comprises one or more opaque electrowetting cells 28 arranged adjacent to surround the fluorescent electrowetting cells 24.

Figure 7:
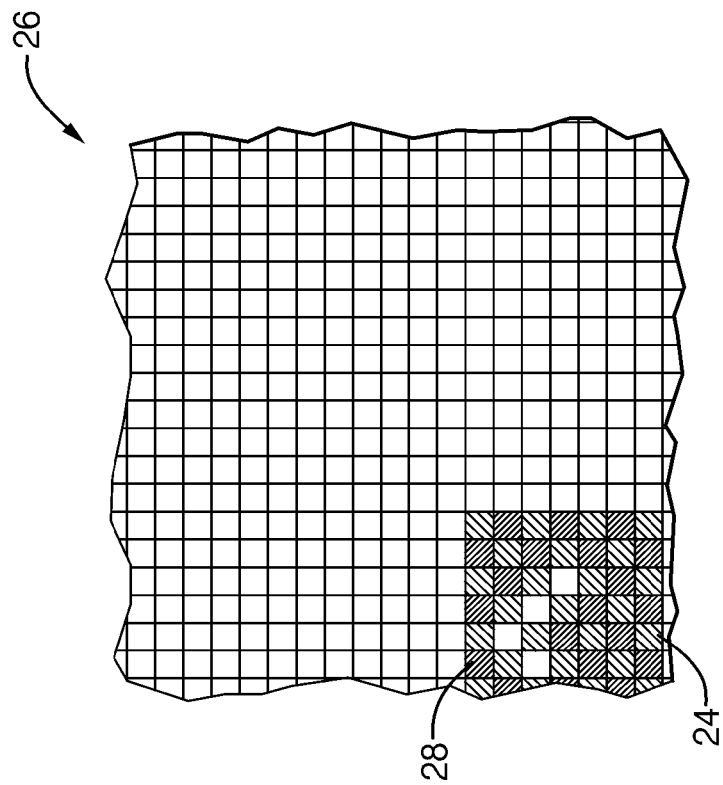
FIG. 7 is a front view of a portion of the windshield assembly of FIG. 1 in accordance with an embodiment.
Figure 6:
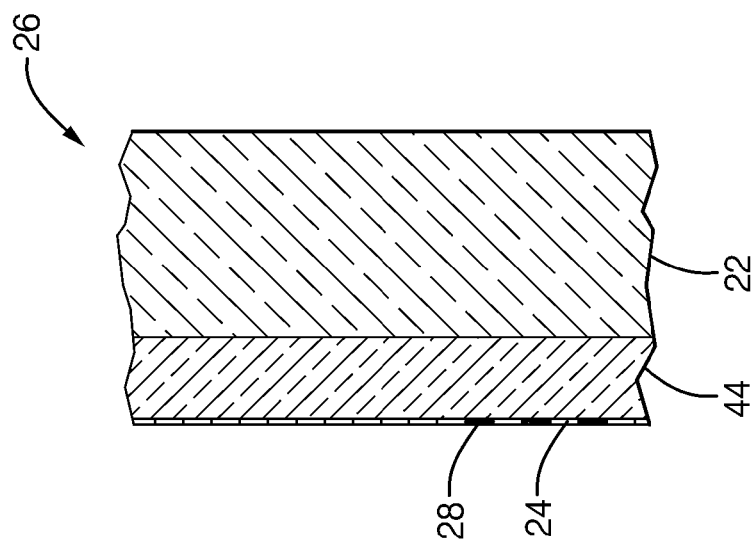
FIG. 6 is a side sectional view of the windshield assembly of FIG. 1 in accordance with an embodiment.

FIG. 6 illustrates a cross section side view of a non-limiting embodiment of the assembly 10 where the fluorescent electrowetting cell 24 and the opaque electrowetting cell 28 are disposed in a common layer 44 overlying the portion 26. FIG. 7 illustrates a front view of FIG. 6 where common layer includes an array of electrowetting cells that includes fluorescent electrowetting cells 24 and opaque electrowetting cells 28. The pattern may be a checkerboard pattern of alternating fluorescent electrowetting cells and opaque electrowetting cells as illustrated, however other shapes and patterns of cells will be readily apparent to those skilled in the art. This arrangement is advantageous over the arrangement shown in FIGS. 3 and 4 because the single common layer 44 is less costly to apply to the windshield 22 when compared to the first layer 30 and the second layer 32. Furthermore, transparent/clear state transmissivity will typically be higher with this common layer arrangement since there are fewer layers for light to pass through.

In another embodiment, the common layer 44 may include one or more fluorescent electrowetting cells configured to display one or more images characterized as having a predetermined shape, and the common layer further comprises one or more opaque electrowetting cells arranged adjacent to the one or more fluorescent electrowetting cells. Such an arrangement would be useful to display the image 42 shown in FIG. 5; however it is recognized that the common layer configuration would not be as suitable for providing the visor function as is the case with other configurations.

Referring again to FIG. 2, the assembly 10 may include a controller 46 configured to operate the fluorescent electrowetting cell 24 and the opaque electrowetting cell 28. The controller may be electrically connected to the fluorescent electrowetting cell 24 and the opaque electrowetting cell 28 by a wire 47, or a plurality of wires, or other interconnecting means known to those in the art such as optical fiber. The controller 46 may include a processor (not shown) such as a microprocessor or other control circuitry as should be evident to those in the art. The controller 46 may include memory, including non-volatile memory, such as electrically erasable programmable read-only memory (EEPROM) for storing one or more routines, thresholds and captured data. The one or more routines may be executed by the processor to perform steps for determining if signals received by the controller 46 for operating the assembly 10 as described herein. The controller 46 may include pushbuttons 48 or the like so the operator 14 is able to configure what information is displayed on the portions 26, 26A, 26B of the assembly 10.

Accordingly, a windshield assembly 10 is provided. Combining the fluorescent electrowetting cells 24 and the opaque electrowetting cells 28 into the assembly 10 provides for a display that can be better viewed when brightly lit backgrounds are present as compared to display that only has fluorescent electrowetting cells.

While this invention has been described in terms of the preferred embodiments thereof, it is not intended to be so limited, but rather only to the extent set forth in the claims that follow.

We claim:

1. A windshield assembly configured for installation onto a vehicle, said assembly comprising:
   a windshield;
   a fluorescent electrowetting cell overlying a portion of the windshield, wherein the fluorescent electrowetting cell is operable to a fluorescent state where the fluorescent electrowetting cell fluoresces when illuminated with suitable light, and operable to a transparent state where most light passes through the fluorescent electrowetting cell; and
   an opaque electrowetting cell arranged proximate to the fluorescent electrowetting cell, wherein the opaque electrowetting cell is operable to an opaque state where most light is blocked from passing through the opaque electrowetting cell, and a clear state where most light passes through the opaque electrowetting cell,
   wherein the portion is substantially transparent when the fluorescent electrowetting cell is operated to the transparent state and the opaque electrowetting cell is operated to the clear state, and the opaque electrowetting cell cooperates with the fluorescent electrowetting cell to contrast an image displayed by the fluorescent electrowetting cell with respect to a field of view beyond the assembly.

2. The assembly in accordance with claim 1, wherein the fluorescent electrowetting cell is disposed in a first layer overlying the portion, and the opaque electrowetting cell is disposed in a second layer between the first layer and the windshield.

3. The assembly in accordance with claim 2, wherein the first layer comprises an array of fluorescent electrowetting cells, and the second layer comprises an array of opaque electrowetting cells underlying the array of fluorescent electrowetting cells.

4. The assembly in accordance with claim 3, wherein the second layer is operated to surround the image displayed by the first layer with an opaque area.

5. The assembly in accordance with claim 2, wherein the first layer comprises one or more fluorescent electrowetting cells configured to display one or more images characterized as having a predetermined shape, and the second layer comprises one or more opaque electrowetting cells arranged adjacent to the one or more fluorescent electrowetting cells.

6. The assembly in accordance with claim 5, wherein the one or more opaque electrowetting cells are a plurality of opaque electrowetting cells configured to surround at least one of the one or more images displayed by the one or more fluorescent electrowetting cells with an opaque area.

7. The assembly in accordance with claim 1, wherein the fluorescent electrowetting cell and the opaque electrowetting cell are disposed in a common layer overlying the portion.

8. The assembly in accordance with claim 7, wherein the common layer comprises an array of electrowetting cells that includes fluorescent electrowetting cells and opaque electrowetting cells.

9. The assembly in accordance with claim 8, wherein the pattern is characterized as a checkerboard pattern of alternating fluorescent electrowetting cells and opaque electrowetting cells.

10. The assembly in accordance with claim 7, wherein the common layer comprises one or more fluorescent electrowetting cells configured to display one or more images characterized as having a predetermined shape, and the common layer further comprises one or more opaque electrowetting cells arranged adjacent to the one or more fluorescent electrowetting cells.

11. The assembly in accordance with claim 10, wherein the one or more opaque electrowetting cells are a plurality of opaque electrowetting cells arranged to surround at least one of the one or more images.

12. The assembly in accordance with claim 1, wherein the assembly further comprises a controller configured to operate the fluorescent electrowetting cell and the opaque electrowetting cell.

13. The assembly in accordance with claim 1, wherein the assembly further comprises a light source configured to illuminate the fluorescent electrowetting cell with suitable light.

* * * * *